(12) United States Patent
Ishihara

(10) Patent No.: US 7,092,093 B2
(45) Date of Patent: Aug. 15, 2006

(54) POLARIZATION BEARING DETECTION TYPE TWO-DIMENSIONAL LIGHT RECEPTION TIMING DETECTING DEVICE AND SURFACE FORM MEASURING DEVICE USING THE SAME

(75) Inventor: Mitsuhiro Ishihara, Aichi (JP)

(73) Assignee: Takaoka Electric Mfg. Co., Ltd., Tokyo (JP)

(*) Notice: Subject to any disclaimer, the term of this patent is extended or adjusted under 35 U.S.C. 154(b) by 0 days.

(21) Appl. No.: 10/494,374

(22) PCT Filed: Mar. 3, 2003

(86) PCT No.: PCT/JP03/02434

§ 371 (c)(1),
(2), (4) Date: May 13, 2004

(87) PCT Pub. No.: WO03/074967

PCT Pub. Date: Sep. 12, 2003

(65) Prior Publication Data

US 2004/0257565 A1 Dec. 23, 2004

(30) Foreign Application Priority Data

Mar. 7, 2002 (JP) ............................. 2002-061575

(51) Int. Cl.
*G01J 4/00* (2006.01)

(52) U.S. Cl. ..................................... 356/369

(58) Field of Classification Search ........ 356/364–369, 356/630–632, 237.1–237.6, 236; 250/225
See application file for complete search history.

(56) References Cited

U.S. PATENT DOCUMENTS

| 5,365,067 A | * | 11/1994 | Cole et al. ............... 250/341.8 |
| 6,151,118 A | | 11/2000 | Norita et al. |
| 6,515,745 B1 | * | 2/2003 | Vurens et al. ............... 356/369 |

FOREIGN PATENT DOCUMENTS

| JP | 3-269205 | 11/1991 |
| JP | 7-229725 | 8/1995 |
| JP | 9-126739 | 5/1997 |
| JP | 11-352054 | 12/1999 |

\* cited by examiner

*Primary Examiner*—Tu T. Nguyen
(74) *Attorney, Agent, or Firm*—Oblon, Spivak, McClelland, Maier & Neustadt, P.C.

(57) ABSTRACT

A polarization bearing detection type two-dimensional light reception timing detecting device for implementing a fast surface shape measurement that can accommodate an animal body measurement, and a surface shape measuring device using it. The polarization bearing of a detection light is turned in synchronization with slit light scanning, and the polarization bearing is two-dimensionally recorded by two sets of analyzers and storage type image detectors in a crossed Nicols arrangement, and thereby it is possible to determine, with only one-time imaging, timing at which a slit light is beamed into respected pixels in the storage type image detectors.

8 Claims, 14 Drawing Sheets

θ : Polarization axis direction
ω : Angular velocity

θ : Polarization axis direction
ω : Angular velocity

POLARIZATION BEARING DETECTION TYPE TWO-DIMENSIONAL LIGHT RECEPTION TIMING DETECTING DEVICE AND SURFACE FORM MEASURING DEVICE USING THE SAME

TECHNICAL FIELD

The present invention relates to an optical device mainly used to measure surface form of an object.

BACKGROUND ART

Many technologies which measure the surface form of an object have been proposed. They are roughly divided into two types: one type measures one point at a time and the other type measures many points simultaneously. Although the one point measurement type is highly accurate and reliable, a large amount of measurement time, from several tens of minutes to several hours, is needed when measuring a whole object surface. On the other hand, while the many point simultaneous measurement type has a feature of high-speed, it has difficulties in respect to reliability and accuracy. A light section method, grating projection phase shifting method, and measuring method using confocal microscopy (hereinafter referred to as "confocal method"), all of which are many point simultaneous measurement types, have high reliability compared with other many point simultaneous measurement methods that have been proposed at the laboratory level and have already been used practically. Although these methods are high in speed compared to the one-point measurement type methods, it cannot be said that these are sufficiently high in speed for in-line inspection in the FA field.

As will be explained later in detail, the light section method, the grating projection phase shifting method, and the confocal method need an imaging device as a detector, and some type of scanning which requires time. Usually, images are acquired with the imaging device for every partial scanning. After many repetitions of this process, the measurement is completed. In practice, one measurement (of one field of view) involves several tens to several hundreds of images either by the light section method or the confocal method. A long measurement time is unavoidable since an imaging cycle of a TV camera as an imaging device is about 30 images per second. The grating projection phase shifting method, although relatively high in speed, needs at least three images which are captured at the different time, therefore measurement of moving objects is still impossible. The light section method, the grating projection phase shifting method, and the confocal method are described below in detail.

FIG. 11 is an example of the measurement system proposed on the basis of the light section method. This system is highly reliable with many practical applications as indicated in the non-patent reference 1. The figure here shows only one slit light scanning part on a side in order to explain only the main points of the above-mentioned reference, while the slit light scanning parts are on both the right and left sides in the reference.

Images are continuously input to the image processing device 115 by a television camera 114, while light from a laser slit light source 111, scanned by a scanning mechanism 112, irradiates an object 10 from an angle different from the optical axis of the imaging lens 113. In one image as shown on the display device 116 of FIG. 11, one slit will appear distorted according to any irregularities on the surface of the object 10. While in FIG. 11 the slit light moves from the right to the left until a slit scan is completed, images of 256 sheets to 512 sheets are input. For every pixel of the image input, the image processing device 115 detects the timing (for example, tp in the figure) at which the value of the pixel becomes the largest, that is, when the slit light passes over the position on the object 10 with which the pixel corresponds, and calculates the three-dimensional position of the object 10 surface as intersection P between the projection angle of the slit light at that time and the angle of the main beam of the imaging lens 113 determined by the position of each pixel. (Uesugi Mitsuaki, 1993, The Optical Three-Dimensional Measurement edited by Toru Yoshizawa, Shin-Gijyutu Communications, page 39–52)

FIG. 12 is an example of a measurement system which uses the confocal imaging system 121. As the confocal imaging system 121, any one of a laser scanning microscope, a Nipkow board scanning microscope, a non-scanning confocal imaging system or the like can be used, and the figure is simplified since any one of these is sufficient.

The main feature of the confocal imaging system 121 is that only the position 122, which is in focus, is imaged, i.e., hardly any light from the portion which is out of focus will reach a detector 123. The feature is called optical sectioning. When the image is continuously input using the detector 123 while moving an object 10 in the optical axis direction by a Z stage 124, only the in focus portion in the field of view is imaged as shown in the display device 116 of FIG. 12 and this portion expresses the contour line. While the object being moved downward from top to bottom in the figure until a scan of the Z stage 124 is completed, about several hundreds of images are input. The image processing device 115 will detect the timing for each pixel when the value of the pixel becomes maximum. That is, the optical system focuses on the position of the object 10 with which the pixel corresponds, and the position of the Z stage 124 at that time will itself express the relative height of the surface of the object 10.

Next, the grating projection phase shifting method is briefly explained using FIG. 13. The grating projecting method projects a plurality of slit light rays simultaneously on an object while the light section method projects one slit light ray. A so-called sinusoidal grating 132 of the phase shifting method, which will be explained below, is used to make transmittance changes in a sinusoidal curve as shown in FIG. 14. The image of the sinusoidal grating 132 illuminated by a lighting source 131 is projected onto the surface of an object 10 by the projection lens 133, and is imaged by an imaging lens 113 and a television camera 114 from a different angle. If the phase of the grating pattern projected for each pixel of the obtained image is known, the relative relief of the surface of the object 10 can be obtained. The phase can be determined by the phase shifting method. By shifting the sinusoidal grating 132 by a known value at least twice with the phase shifter 134, at least three images of the projected grating with different phases are taken. More than three values will be obtained for every pixel from at least three or more images with different phases, and since these values are considered to be values sampled from the sinusoidal curve, the phase can be obtained as the initial phase by fitting to the sinusoidal curve.

DISCLOSURE OF THE INVENTION

As mentioned above, both the light section method and the confocal method also need to perform many image inputs and much image processing for one measurement, therefore high-speed measurement cannot be hoped for. Moreover, measurement of moving objects is impossible even with the comparatively high-speed grating projection phase shifting method since at least three images with a time gap are required.

An object of the present invention is to realize high-speed surface form measurement that can deal with moving objects.

In order to solve the above-mentioned technical problems, the present invention proposes a polarization direction detection type two-dimensional light reception timing detection device comprising: a linear polarization rotation means to linearly polarize incident light and to rotate the polarization direction; an analyzing means to divide the incident light which passes through the linear polarization rotation means into at least two different linear polarization components; at least two synchronized charge type imaging devices that receive each divided incident light ray and convert the light intensity into an electric signal, and output the signal; and an image analysis device which analyzes a plurality of image signals output from the charge type imaging devices.

The polarization direction detection type two-dimensional light reception timing detection device can have more reliability by equipping it with the depolarizing means which converts the incident light to light with almost no intensity change with respect to the polarization direction before the incident light enters the linear polarization light rotation means. The surface form measurement device by the light section method comprises an imaging lens; a slit light scanning means to illuminate an object plane of the imaging lens with at least one slit light from an angle different from the optical axis direction of the imaging lens, and to scan the slit light over the object plane; and the polarization direction detection type two-dimensional light reception timing detection device wherein the charge type imaging devices have been arranged at an image plane of the imaging lens; wherein the field of view of the charge type imaging devices is scanned by the slit light scanning means within one exposure time of the charge type imaging devices, and the polarization direction of the incident light to the analyzing means is rotated in synchronization with the scanning of the slit light ray by the linear polarization rotation means. Furthermore, the surface form measurement device of the confocal method comprises a confocal imaging optical system; a Z-direction scanning means which changes the relative optical pass length between an object and the confocal imaging optical system; and the polarization direction detection type two-dimensional light reception timing detection device wherein the charge type imaging devices have been arranged at an imaging plane of a confocal imaging optical system; wherein, within one exposure time of the charge type imaging devices, a measurement range is scanned by the Z-direction scanning means, and the polarization direction of reflective light from the object incident on the analyzing means is rotated by the linear polarization rotation means in synchronization with the scanning over the measurement range.

Furthermore, the surface form measurement device comprises an imaging lens; an illuminating means to illuminate an object simultaneously in pulses; and the polarization direction detection type two-dimensional light reception timing detection device wherein the charge type imaging devices have been arranged at the image plane of the imaging lens; wherein, within one exposure timeof the charge type imaging devices, the whole measurement range is illuminated simultaneously at least once by the illuminating means, and the time by which the charge type imaging devices have received the object reflected light is detected.

Constituting the surface form measurement device as mentioned above, measurement is completed by only one exposure time and the processing of several images taken simultaneously without a time gap, thus high-speed measurement applicable also to moving objects is attained.

EXPLANATION OF SYMBOLS

Figure 1:
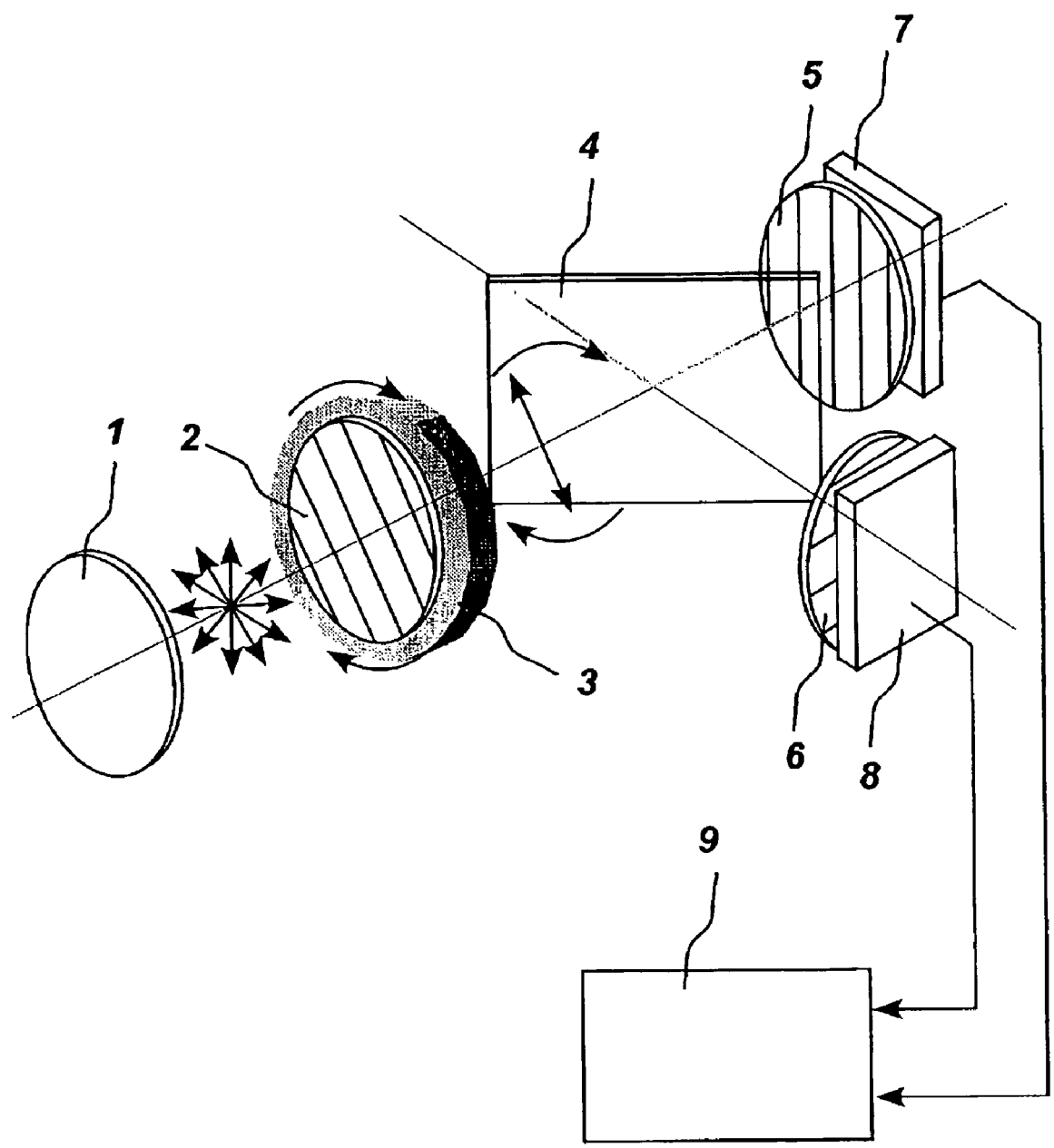
FIG. 1 is a figure for explaining a first embodiment of the polarization direction detection type two-dimensional light reception timing detection device of the present invention.

1 Depolarizing means
2 Polarizer
3 Rotation mechanism
4 Non-polarizing beam splitter
5 and 6 Analyzer
7 and 8 Charge type imaging device
9 Image analysis device
10 Object
111 Laser slit light source
112 Scanning mechanism 113 Imaging lens
114 Television camera
115 Image processing device
116 Display device
121 Confocal imaging system
122 Position in focus
123 Detector
124 Z stage
502,503, and 504 Analyzer
505,506, and 507 Charge type imaging device

BEST MODE FOR CARRYING OUT THE INVENTION

Hereafter, with reference to the drawings, the form of the embodiment of this invention will be explained in detail. The first embodiment of the polarization direction detection type two-dimensional light reception timing detection device of the present invention is shown in FIG. 1.

Light propagated from the left-hand side is depolarized by a depolarizing means 1. If the incident light is light with a certain bandwidth, a so called "Lyot" depolarizer suits the depolarizing means 1, which is made of two crystals, one of which is a few times thicker than the other, bonded together in such a way that the angle made by the two optical axes is 45 degrees. In the alternative, if the incident light is linearly polarized to a certain angle, a ¼ wave plate and the like may be used. It is necessary to merely provide light which does not change a great deal in intensity by the direction of the polarization when the light is linearly polarized. It does not, however, need to be completely depolarized. For example, it is sufficient also when the light is circularly polarized, by a ¼ wave plate, as mentioned above. Moreover, there is, in some cases, no need to use a depolarizing means 1, since the incident light itself is already in a depolarized state because of the character of the light source and an object to be used. Moreover, depending on the kind of linear polarization rotation means explained below, there is no need to depolarize the light.

Depolarized light (or circularly polarized light) is incident on a linear polarization rotation means which consists of a polarizer 2 and its rotation mechanism 3, and turns into linear polarized light, the direction of the polarization rotates as time progresses. The linear polarization rotation means may be realized by elements with electro-optic effect, magneto-optic effect, or the like so that the axis direction of the linear polarized light is rotated (optical rotation) as time progresses. For example, since the liquid crystal has optical rotational power, it can rotate the polarization direction of the linear polarized light after passing a fixed polarizer electrically. In this case, the depolarizing means 1 is unnecessary.

The incident light which became linearly polarized light with the rotating polarization direction reaches an analyzing means which consists of a non-polarized beam splitter 4, and two analyzers 5 and 6 with their optical axes mutually crossing at a right angle. Regardless of the direction of polarization using the non-polarizing beam splitter 4, the light wave is split into two optical waves with the polarization states remaining as before, and the energy becomes half respectively. The components which are perpendicular to each other pass through the individual analyzers 5 and 6, and the intensity of each component is detected by two charge type imaging devices 7 and 8.

As an analyzing means, a polarizing beam splitter which has the functions of both the non polarizing beam splitter 4 and analyzers 5 and 6 may, of course, be used because of a lower optical loss. In order to raise the accuracy of the polarizing characteristic, not only may the polarization beam splitter be used, but analyzers 5 and 6 may also be used.

Two charge type imaging devices 7 and 8 are disposed optically in the same position. For example, when the devices are used with a imaging lens, these are arranged so that the light reception surface of the charge type imaging devices 7 and 8 may come to the image plane of the imaging lens, and this optical distance (optical pass length) from the imaging lens to the two charge type imaging devices 7 and 8 both completely come to be the same. Moreover the pixels of the same coordinates (xi, yi) of the charge type imaging devices 7 and 8 correspond to the same position on the surface of an object. (This is not an absolute condition, however. The condition is eased by having a compensation means. But for the time being, it is assumed that the above-mentioned condition is fulfilled here.) Moreover, operation of these two charge type imaging devices 7 and 8 is synchronized. That is, the release timing of each shutter and the duration of shutter releasing are always in agreement, and the obtained images are simultaneously sent to an image analysis device 9 as electric signals. Inside the image analysis device 9, light reception timing is calculated for every pixel from the two sheets of images obtained simultaneously from the charge type imaging devices 7 and 8 respectively.

As the charge type imaging device, the most common device at present is a two-dimensional CCD camera, but any two-dimensional detection device of all pixel simultaneous exposure types is appropriate.

The above-noted assembly is the structure of the first embodiment of the polarization direction detection type two-dimensional light reception timing detection device. Next, the function of this device is described. This device can record the timing (time difference) at which light arrives on each pixel within the duration of one exposure of the charge type imaging devices 7 and 8 by the direction of polarization.

Figure 2:
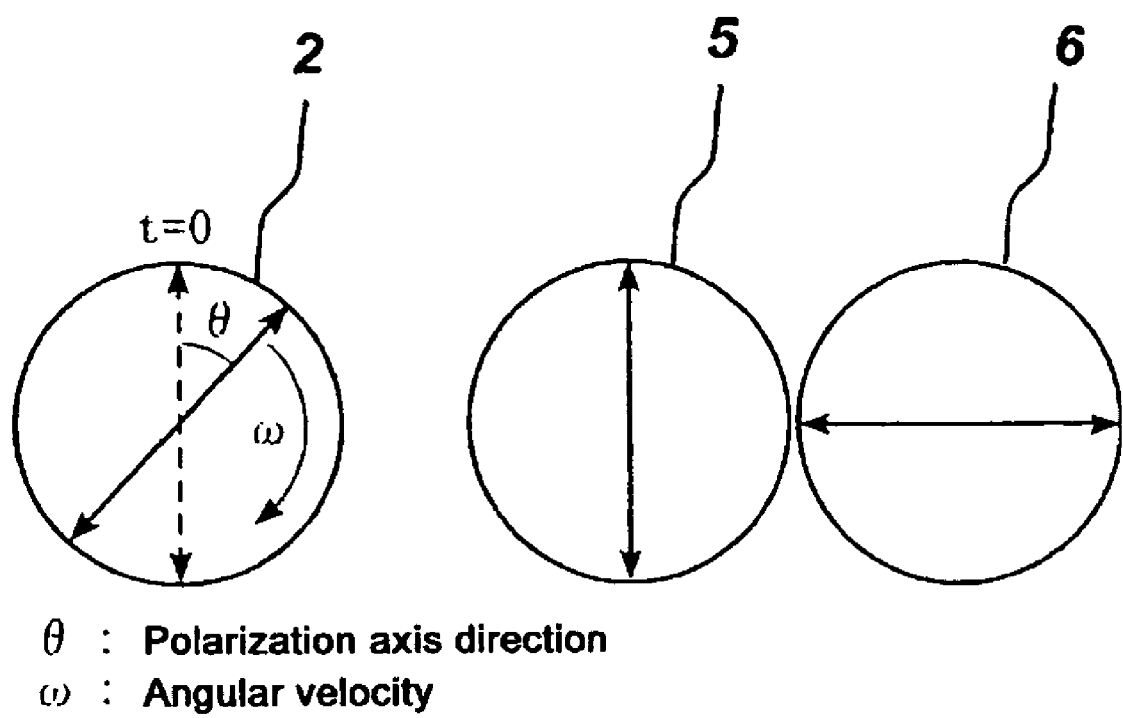
FIG. 2 is a figure for explaining polarization axis directions of a polarizer and analyzers of the first embodiment of the polarization direction detection type two-dimensional light reception timing detection device.
Figure 3:
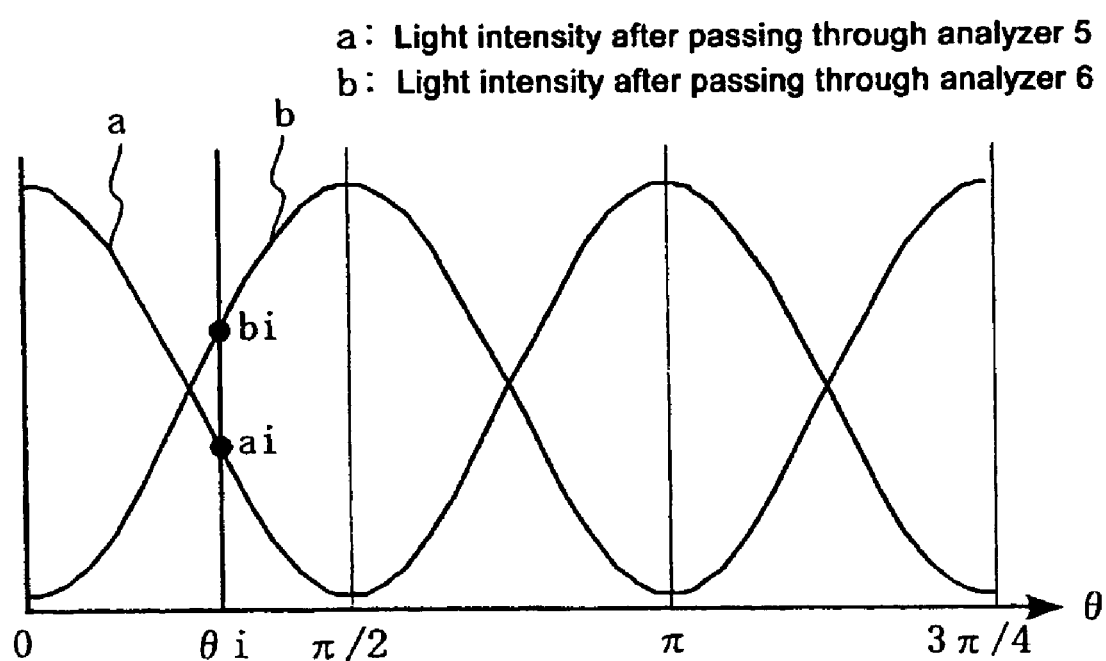
FIG. 3 is a figure showing change of the incident light intensity after the light has passed through the analyzers in the first embodiment of the polarization direction detection type two-dimensional light reception timing detection device.
Figure 4:
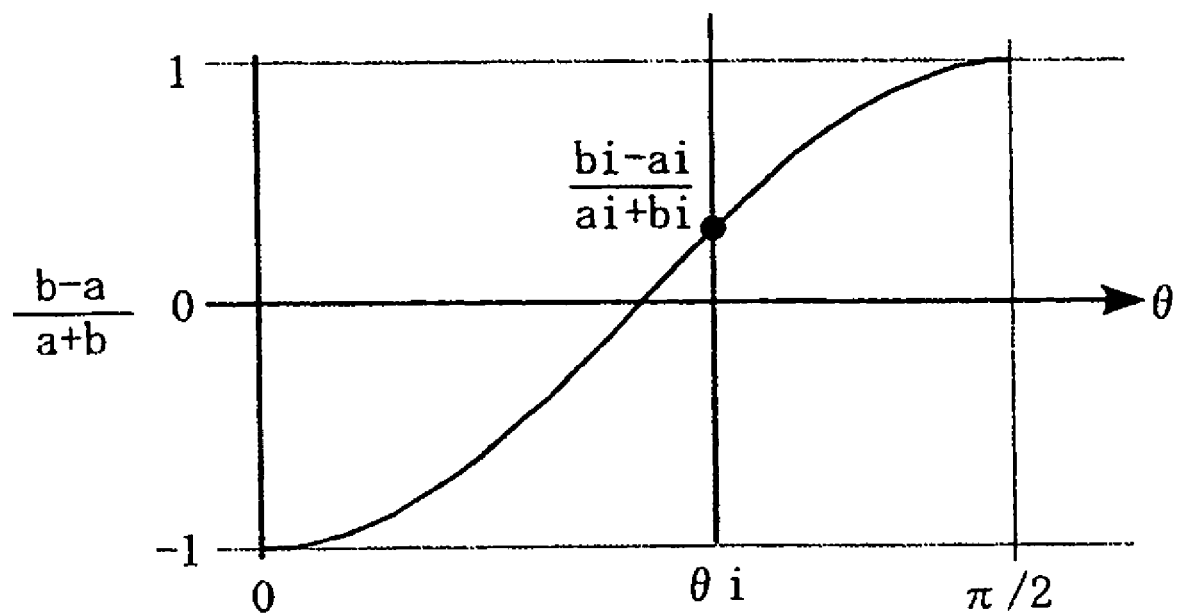
FIG. 4 is a figure showing change of the light intensity ratio after the light has passed through the analyzers in the first embodiment of the polarization direction detection type two-dimensional light reception timing detection device.

With reference to FIGS. 2–4, the function is explained in detail. As in FIG. 2, the polarization direction θ after passing the linear polarization rotation means rotates at an angular velocity ω with the initial state parallel to the polarizer 5. Supposing a continuous light of constant intensity is incident on the device, the intensity of the incident light after passing through the two analyzers 5 and 6 will become as shown in FIG. 3. Here, when the polarization direction θ is considered only between 0–π/2 after passing through the linear polarization rotation means, the calculation of the ratio of incident light intensities (b−a)/(a+b) after passing through the two analyzers 5 and 6 will be as shown in FIG. 4, and it becomes almost linear except at both ends, and more correctly, it changes in a sinusoidal form.

The case of an incoming pulse-light and not a continuous light is considered. Suppose that the polarization direction θ after passing through the linear polarization rotation means rotates 0–π/2 and the light comes only at the time ti. The shutters of the charge type imaging devices 7 and 8 are released in synchronization with a polarization direction rotation. That is, assuming that while the polarization direction rotates from 0 to π/2 and the shutters are kept released, the output of ai and bi will be obtained according to the polarization direction θ when the light reaches the charge type imaging devices 7 and 8 respectively, as shown in FIG. 3. From these values, θi can be obtained by calculation of the ratio of intensity (b−a)/(a+b), and by correspondence with the FIG. 4. Moreover the time ti is derived by ti=θi/ω. If pulse lights reach to each pixel at different timings, and if the timings are within the exposure duration of the charge type imaging devices 7 and 8, the intensity ratio of each pixel shows the polarization direction of each timing, thereby the light reception timing of light can be calculated for every pixel with the image analysis device 9.

The above is the first embodiment of the polarization direction detection type two-dimensional light reception timing detection device. Next, a second embodiment of the polarization direction detection type two-dimensional light reception timing detection device is explained using FIGS. 5–7.

Figure 5:
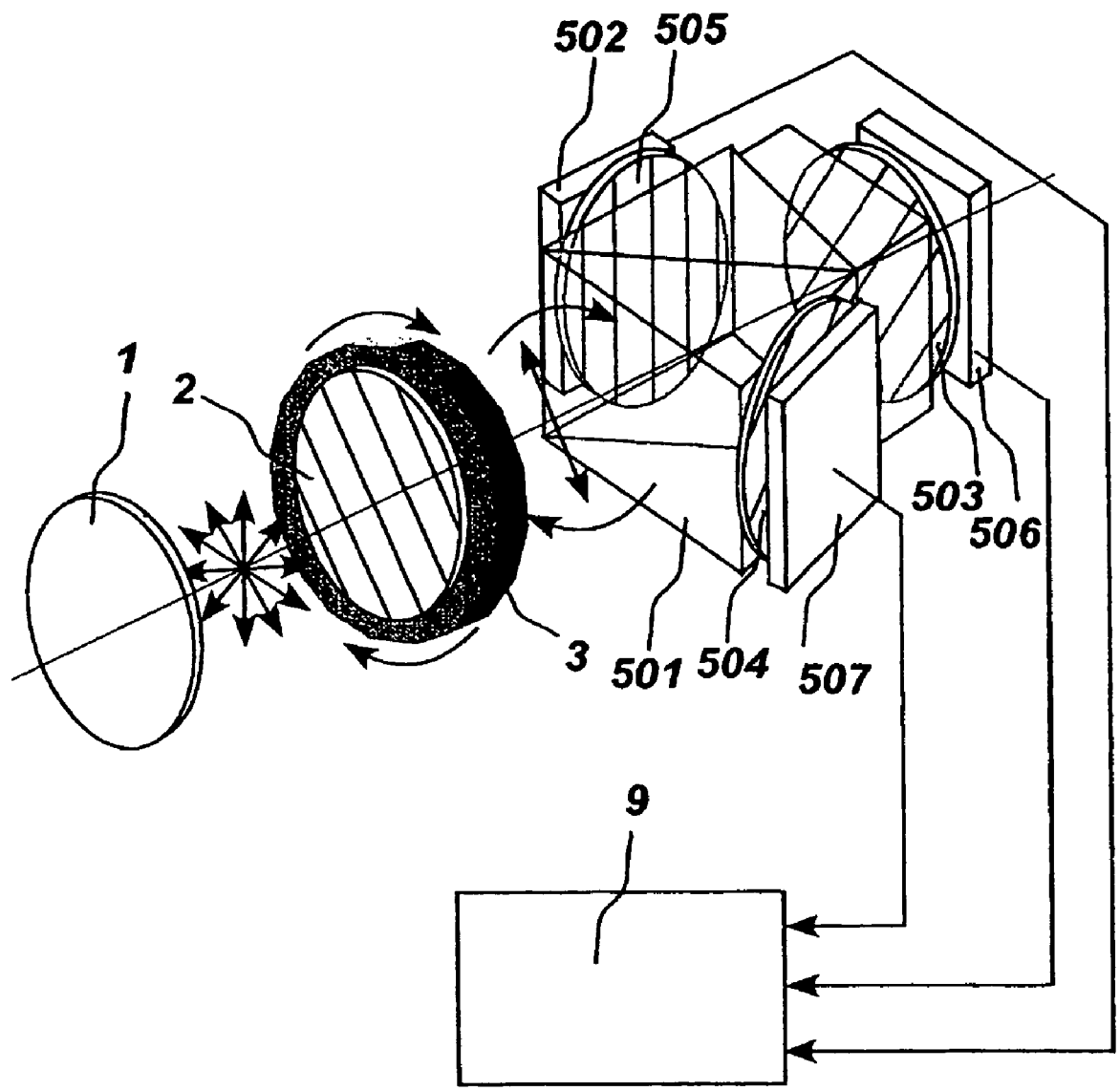
FIG. 5 is a figure for explaining a second embodiment of the polarization direction detection type two-dimensional light reception timing detection device of this invention.

The second embodiment of the invention of the polarization direction detection type two-dimensional light reception timing detection device is shown in FIG. 5. Since the depolarization means 1 and the linear polarization rotation means are completely the same as those of the first embodiment, their explanation is omitted. An incident light that has become linearly polarized light with the rotating polarization direction is split by a beam splitter 501 into three directions. In the first embodiment, the number of division was two, and the fact that light is divided into three directions differs from the first embodiment. Although the explanation given below is for the case where the number of divisions is three, the number of directions is not necessarily restricted to three. More than three directions are also acceptable.

A beam splitter 501 as shown in FIG. 5, as an example, is realizable by using an amplitude division coat at the bonded portion of a combination prism that is commonly used in a 3 CCD type color camera. If the flux division ratio of the coat near the side of the incident light is set to 1:2, and another coat is set to 1:1, then division into three becomes possible. Four right-angled prisms can be used by bonding them together. If a coat with half flux division is used on all bonding planes, light from an arbitrary direction is projected in an individual direction with the ¼ flux.

Figure 6:
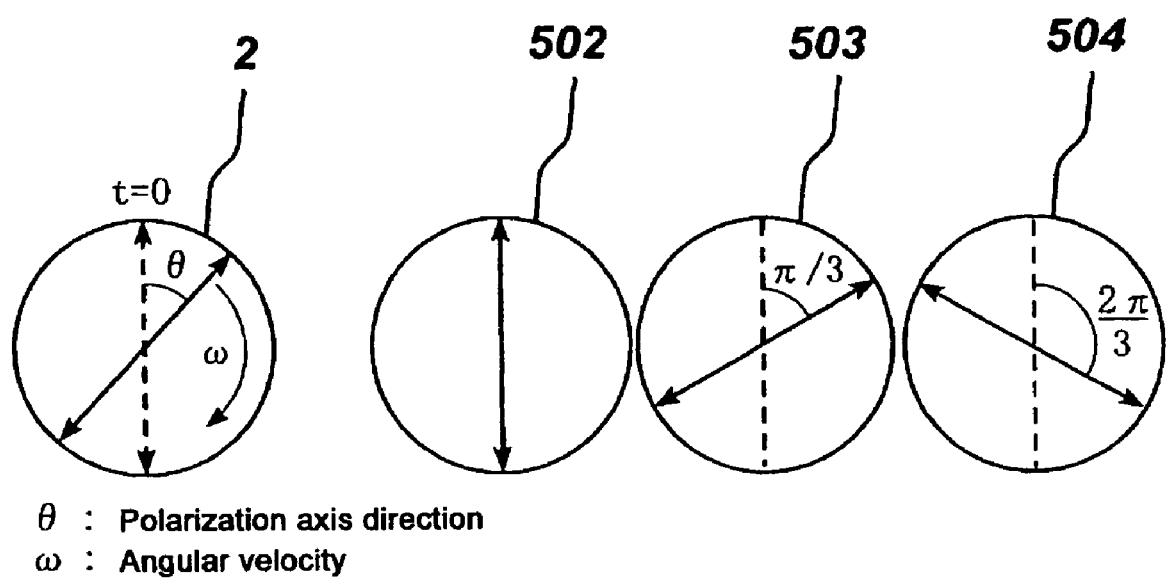
FIG. 6 is a figure for explaining the polarization axis directions of the polarizer and the analyzers in the second embodiment of the polarization direction detection type two-dimensional light reception timing detection device.

As shown in FIG. 6, incident light divided into three reaches analyzing means consisting of three analyzers 502, 503, and 504, for which the polarization directions differ by $\pi/3$, from each other. Regardless of the direction of polarization, the polarization state remains as is, and its flux is divided into ⅓ to ¼ by a beam splitter 501, and the intensity of the light which passes through three sheets of analyzers 502, 503, and 504, with the polarization directions differing by $\pi/3$, is detected by three charge type imaging devices 505, 506, and 507.

The three charge type imaging devices 505, 506, and 507 are arranged optically at the same position. For example, in the case in which these devices are used with a imaging lens, although these are arranged so that the light reception plane of the charge type imaging devices 505, 506, and 507 comes to the image plane of the imaging lens, this optical distance (optical pass length) from the charge type imaging devices 505, 506, and 507 to the imaging lens becomes completely the same, and the pixel of the same coordinates (xi, yi) of the charge type imaging devices 505, 506, and 507 corresponds to the same position on the object. (This condition is not absolute and with some compensation means could be eased. For the time being, explanation is given on the assumption that the above-mentioned conditions are fulfilled here.) Moreover, operation of these three charge type imaging devices 505, 506, and 507 is synchronized. That is, the release timing of each shutter and the duration of the shutter releasing are always in agreement, and the obtained images are simultaneously sent to the image analysis device 9 as electric signals. Inside the image analysis device 9, light reception timings are calculated for every pixel from three images obtained simultaneously from the charge type imaging devices 505, 506, and 507, respectively.

The above noted assembly is the structure of the second embodiment of the polarization direction detection type two-dimensional light reception timing detection device. Next, the function of this device is described. This device can record the timing (time difference) at which light arrives on each pixel within one exposure of the charge type imaging devices 505, 506, and 507, by the directions of polarization.

Figure 7:
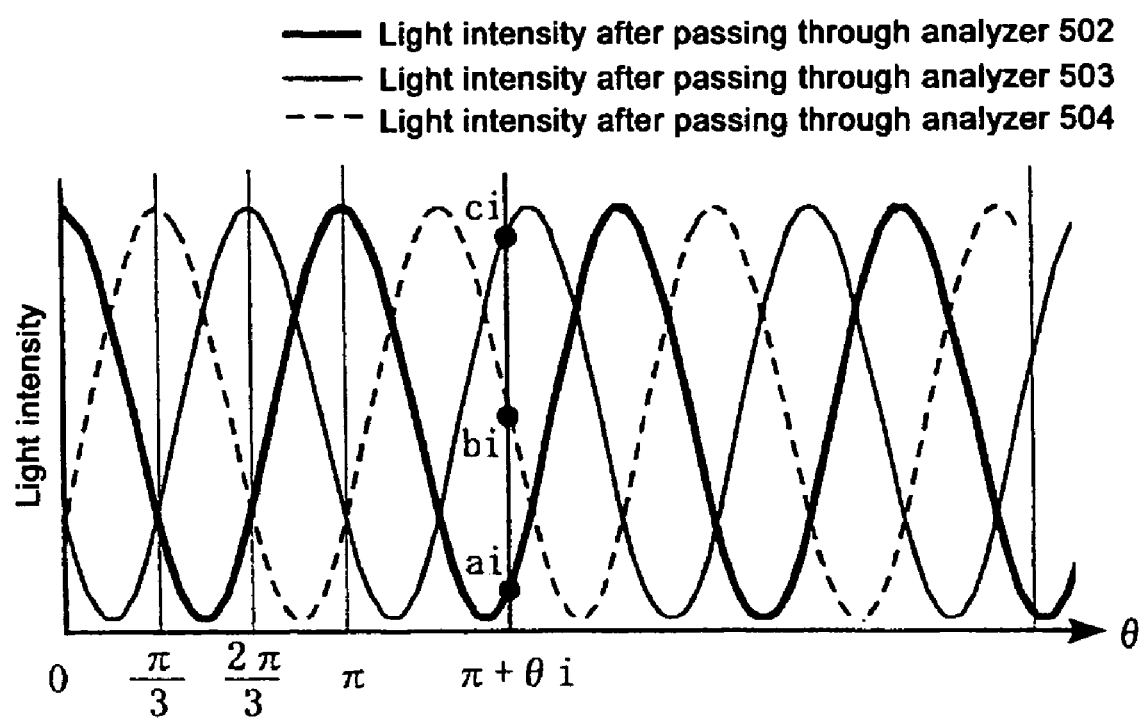
FIG. 7 is a figure showing change of the incident light intensity after the light has passed through the analyzers in the second embodiment of the polarization direction detection type two-dimensional light reception timing detection device.

With reference to FIGS. 6 and 7, the function will be explained more specifically. As shown in FIG. 6, when the polarization direction $\theta$ after being subjected to a linear polarization rotation means rotates at an angular-velocity $\omega$, supposing that an initial state is parallel to an analyzer 502, and a continuous light of constant intensity is incident on the device, the change of the incident light intensity after passing through three analyzers 502, 503, and 505, is sinusoidal wave-like as shown in FIG. 7 with a phase shift of $2\pi/3$ (polarization direction $\pi/3$) mutually.

Next, the case where the incident light is not continuous but a pulse is considered. Here it is assured that the polarization direction $\theta$ after passing through the linear polarization direction rotation means rotates continuously, and light is incident at an instant ti only. Supposing the shutters of the charge type imaging devices 505, 506, and 507 are released at the polarization direction $\theta=0$ and it is exposed until, for example, $\theta=N\pi$, as shown in FIG. 7, the outputs (ai, bi, and ci) of the charge type imaging devices 505, 506, and 507 are obtained respectively and the outputs (ai, bi, and ci) correspond to the polarization direction $\theta i$ of the timing when the light enters. Therefore $\theta i$ can be calculated from these values. However, one must note that the calculated $\theta i$ contains indefiniteness of $n\pi$. Specifically, if I is the mean light intensity and I·$\gamma$ is the grating pattern amplitude, then ai=I[1+$\gamma$·cos($\theta i-2\pi/3$)], bi=I[1+$\gamma$·cos($\theta i$)], and ci=I[1+$\gamma$·cos($\theta i+2\pi/3$)], therefore, $\theta i$=arctan[$\sqrt{3}$·(ai−ci)/(2bi−ai−ci)]. Furthermore, the timing ti can be derived by the operation of ti=$\theta/\omega$ (n$\pi/\omega$ is indefinite). Here it is assured that pulse light is incident on each pixel at a different timing. If this is within the duration of the exposure of the charge type imaging devices 505,506, and 507, the pixel output of the intensity ratio that shows the polarization direction $\theta$ at the timing of light reception for every pixel will be obtained, and the light reception timing can be calculated for every pixel with the image analysis device 9.

Here, although three analyzers 502, 503, and 504 with a polarization direction differing by $\pi/3$ were considered, this of course does not limit the present invention. Each interval of a polarization direction can be $\pi/4$, and may be random. The only requirement is that the polarization directions of polarizers are known. There could be more than three analyzers, four or five are also acceptable. The only requirement is to be able to fit the values to the sinusoidal wave. Using more values leads to higher phase detection accuracy.

In the first embodiment or in the second embodiment, the reason why this invention is new and effective is that the timing when the incident light hits each pixel can be derived with only one exposure (although a set of images is acquired). Conventionally, when using a charge type imaging device like a CCD camera in order to detect the timing of incident light on each pixel, many images must be taken continuously, and the image that gives the maximum pixel output is chosen, and from the number of the image (the order with respect to time), the light incident timing is derived.

Next, we discuss more specific examples of how the light section method, the grating projection phase shifting method, and the confocal method are made faster using the polarization direction detection type two-dimensional light reception timing detection device.

Figure 8:
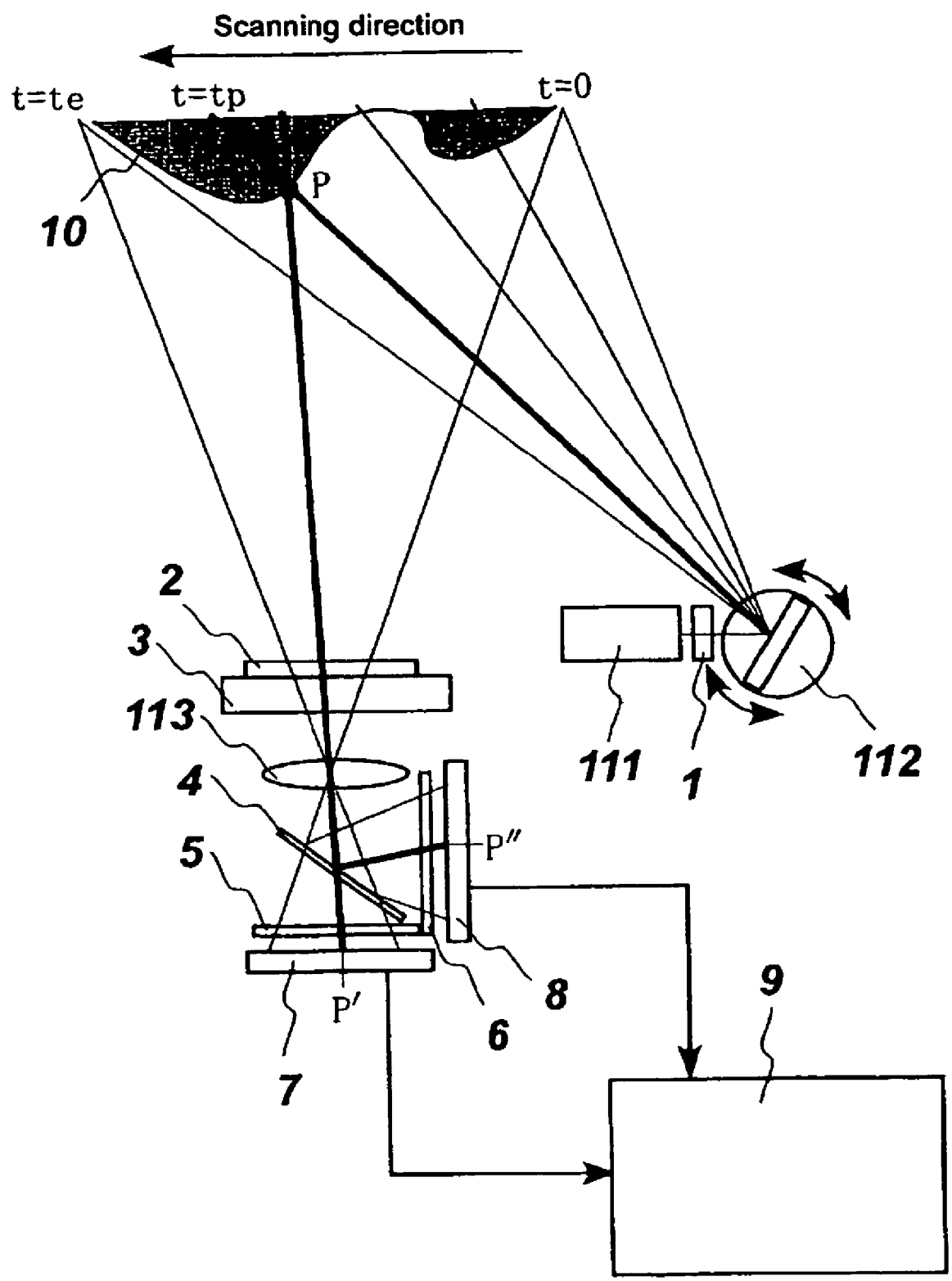
FIG. 8 is a figure for explaining the light section surface form measurement system of the present invention.

Using FIG. 8, we first discuss how to make the light section method faster. FIG. 8 shows an example of the first embodiment of this invention of the polarization direction detection type two-dimensional light reception timing detection device applied to a conventional system of the light section method. The principle of measurement of relief on an object 10 is the same with the conventional system. That is, a slit light is projected on the object 10 at an angle different from the optical axis of an imaging lens 113 and scanned by a scanning means 112 over the whole field of view determined by the imaging lens 113 and a charge type imaging devices 7 and 8. By detecting the timing of light incident on each pixel in the charge type imaging devices 7 and 8 (or of the slit light passing the object 10 surface point corresponding to the pixel), the angle of the slit light is derived from the timing. The position of the surface of the object 10 is calculated as the crossing point of the two lines; one line is made by the chief ray of the imaging lens 113 incident to the pixel, and another line is made by the slit light with the angle determined as above.

In the example like this light section method of the slit light scan type, if we set aside special cases such as multiple reflections due to the gloss of the object 10 surface or having two or more reflective surfaces in the optical axis direction like a film or glass plate, the only time at which a light is incident on a certain pixel is when the slit light passes the corresponding point on the object surface, and that is only once in a scanning over one field of view.

If, while the shutters (electronic shutter) of the charge type imaging devices 7 and 8 are kept released, the direction of the linear polarization light incident to the analyzers can be rotated in synchronization with the slit light scanning over the whole field of view from the left end to the right end of FIG. 8 (for example, when the slit light is at the right end, the polarization direction is 0, and when the slit light is at the left end, the polarization direction is π/2, and between them, it rotates at a constant angular velocity ω), lights like pulse lights are incident on each pixel only when the slit light passes the corresponding surface position of the object 10 and when the scanning of the slit light is completed and the shutter of the charge type imaging devices 7 and 8 are shut, the intensity ratio which shows the polarization direction when the incident light hits the pixel will be recorded at each pair of pixels of the charge type imaging devices 7 and 8.

Figure 9:
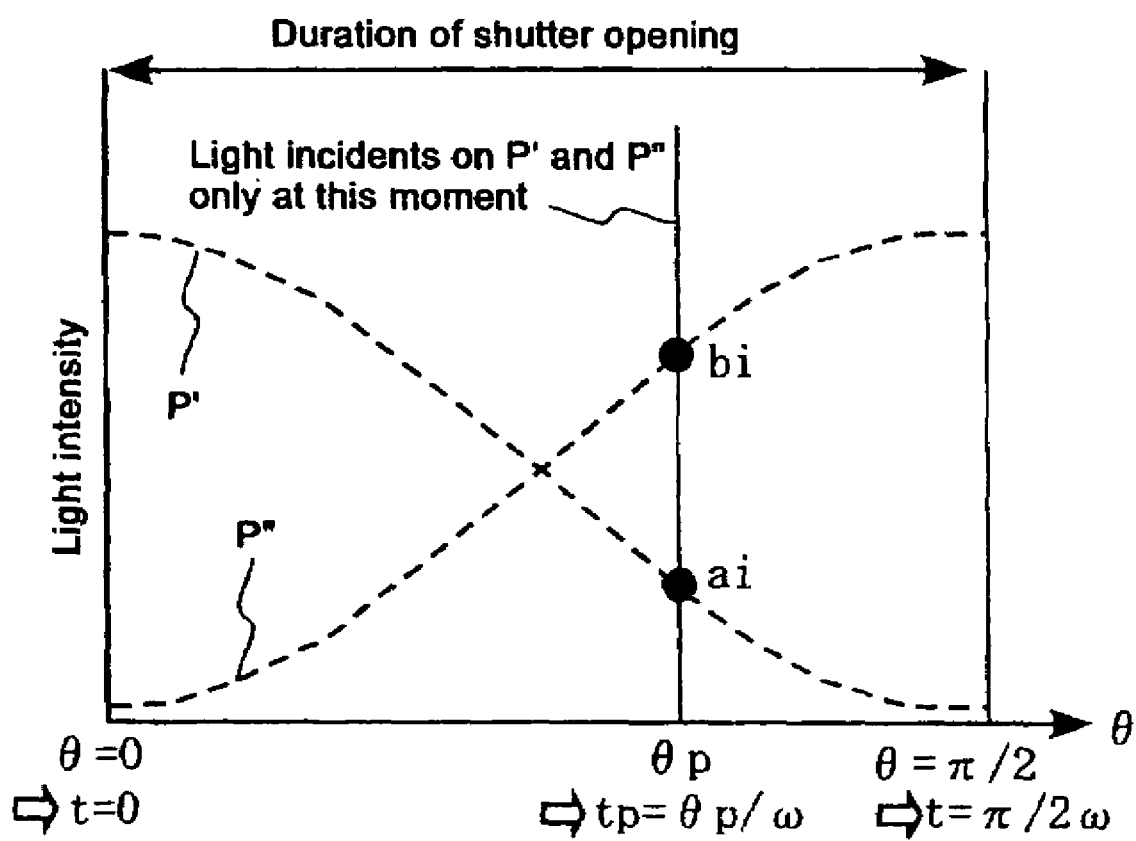
FIG. 9 is a figure for explaining the function of the light section surface form measurement system of the present invention.

FIG. 9 shows the state in which, at the timing tp, the light hits a pair of pixels P' and P'' in the charge type imaging devices 7 and 8 (when the slit light passes the corresponding point on the surface of an object) in FIG. 8, in which the horizontal axis indicates the polarization direction. Since lights are incident on the charge type imaging devices 7 and 8 only at the timing of tp, output values can be obtained which are proportional to the light intensity ai and bi, corresponding to the polarization direction θi at the time. θi is derived from the intensity ratio (bi−ai)/(ai+bi), and the timing can be calculated by the formula ti=θi/ω.

If light reception timing of all pixels is obtained as mentioned above, the height (Z position) of the object 10 surface corresponding to each pixel can be calculated by easy processing of the image analysis device 9, since the following information can be obtained in advance: the relation of the timing and the projection angle of the slit light, the chief ray angle of the imaging lens 113 as that ray hits each pixel, and the geometrical arrangement between the imaging lens 113 and the scanning mechanism 112.

If all the combinations of ai and bi for every pixel are calculated and stored in a table in advance, the output value of the charge type imaging devices 7 and 8 can also be changed directly into the surface height of the object 10 by merely using the table. Of course, it is also possible to constitute a reference table with the values of the intensity ratio (bi−ai)/(ai+bi). At any rate, since calculation of the surface form of an object 10 is very simple, even by software processing, a sufficient video rate measurement of the surface form of an object 10 can be realized by using a high-speed CPU.

The implementability of hardware parts of the system is now examined briefly. Suppose a Galvano scanner is used as a scanning mechanism 112, less than 1 ms of the scan over one field of view is possible and one quarter rotation (0–π/2 polarization direction rotation) within 1 ms (15000 rpm) is easily performed if a motor is used as a polarization rotation means. That is, not only measurement of the video rate (33 ms) is possible, but three-dimensional freezing measurement (which correspond to high-speed shutter operation of a camera) of moving objects is also possible.

Next, measurement resolution ability is considered. The measurement resolution ability is obviously restricted by the angle detection resolution ability of a projection slit. The number of divisions within the scanning angle range is important, but as is clear from FIG. 3, since the device can be only used in the domain of the monotone increasing or decreasing, the number of divisions can not normally exceed the quantization number (gradation number) S of a image, which number is detection values of the detector that varies from 0 to S. In fact, it will become much smaller than S due to heterogeneity of reflectance of the object or the noise factor due to various causes.

The case that the second embodiment is applied to the system as the polarization direction detection type two-dimensional light reception timing detection device is considered hereafter. In the case of the second embodiment as shown in FIG. 7, the domain is not restricted in the monotone increasing or decreasing region, at least the range from 0 to π can be used, and if the indefiniteness of nπ is permitted, the domain over more than two cycles can be used, thus a very fine angle detection resolution can be provided. For example, supposing N cycle domain is used, a slit will be scanned from one end of a image to the other within one exposure time of the charge type imaging devices 505, 506, and 507, and the polarizer 2 will rotate N/2 times. In this way, sinusoidal grating pattern images with N fringes are obtained and the phase of grating of each three images has shifted mutually. That is, if one takes only the obtained images into account, images completely the same as the ones obtained from the grating projection phase shifting method are obtained. If a processing equivalent to that used in the grating projection phase shifting method is applied, measurement of the same accuracy as the grating projection phase shifting method can naturally be performed. All are not necessarily the same, however. Projected patterns may not be sinusoidal patterns which are difficult to manufacture, a rectangle-slit is sufficient. Since three phase shift images can be obtained simultaneously, a good characteristic is provided, in that the measurement for moving objects is possible. Moreover, the number of slits does not need to be one. For example, if N slits are provided, the scanning range becomes 1/N and light intensity is quantitatively advantageous. When two or more slit lights are projected, the direction of polarization must be made to become the same at the beginning of a scan as at the end of the scan, that is, the direction is a multiple of π.

Figure 10:
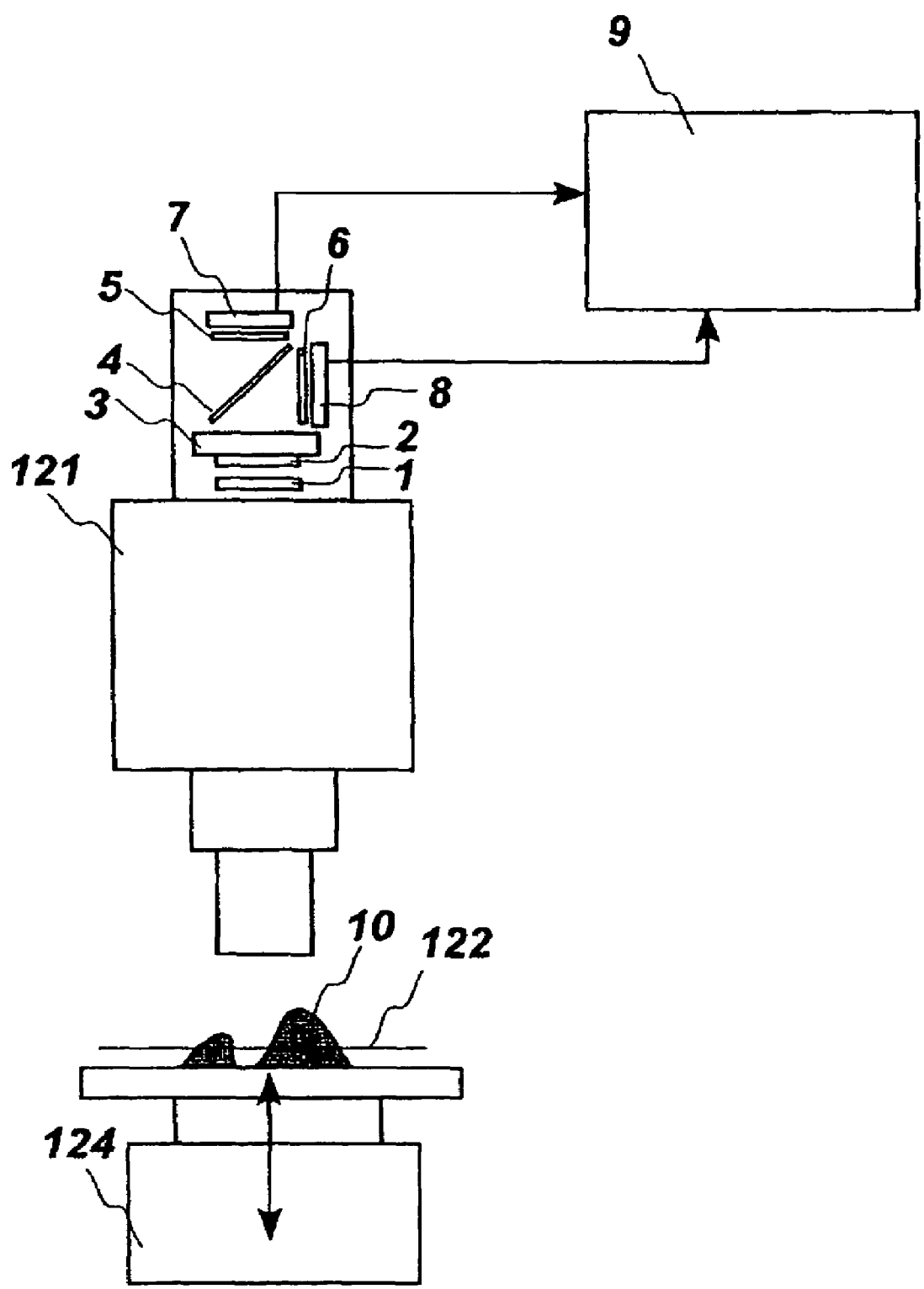
FIG. 10 is a figure for explaining the confocal surface form measurement system of the present invention.
Figure 11:
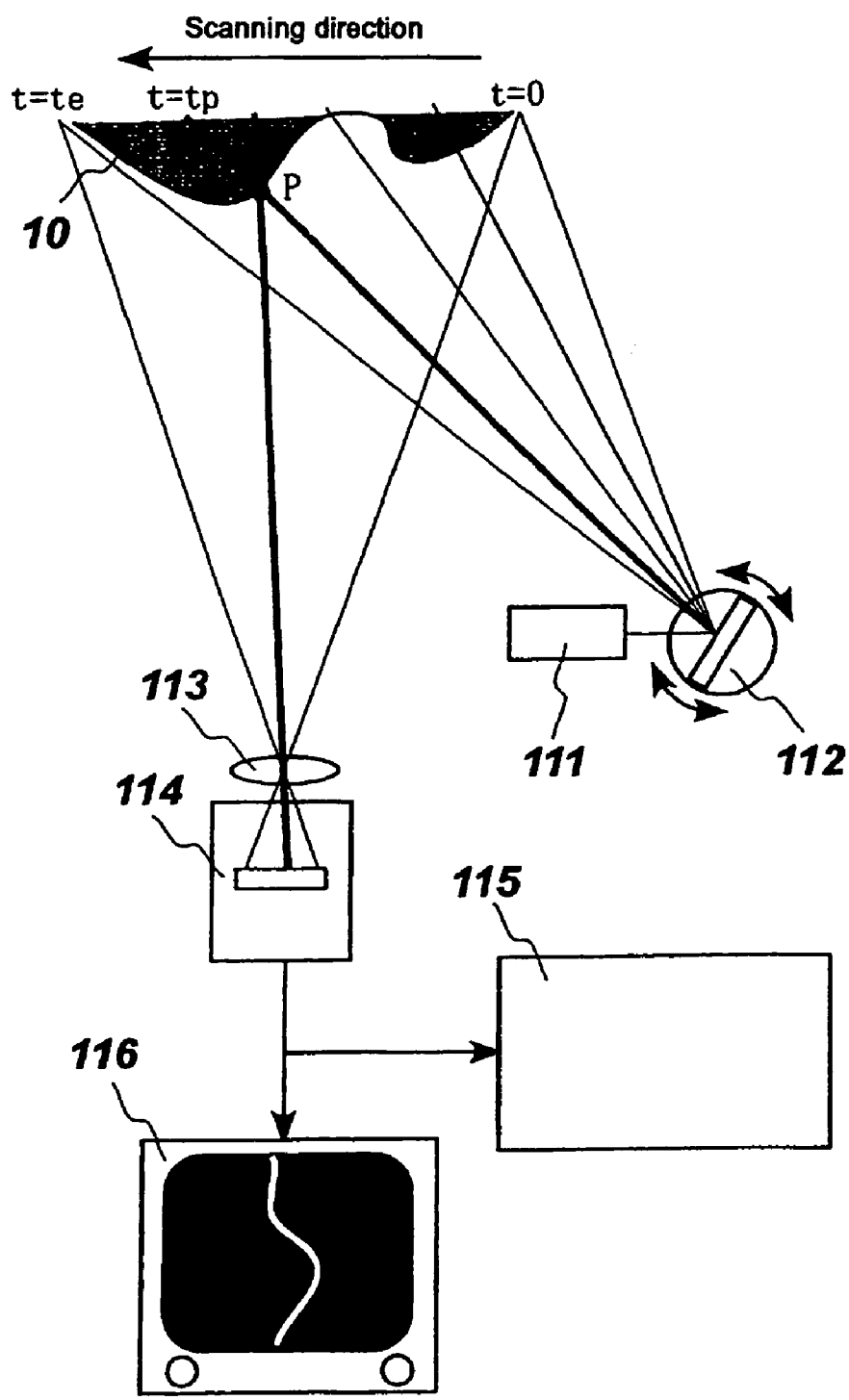
FIG. 11 is a figure for explaining the conventional light section surface form measurement system.
Figure 12:
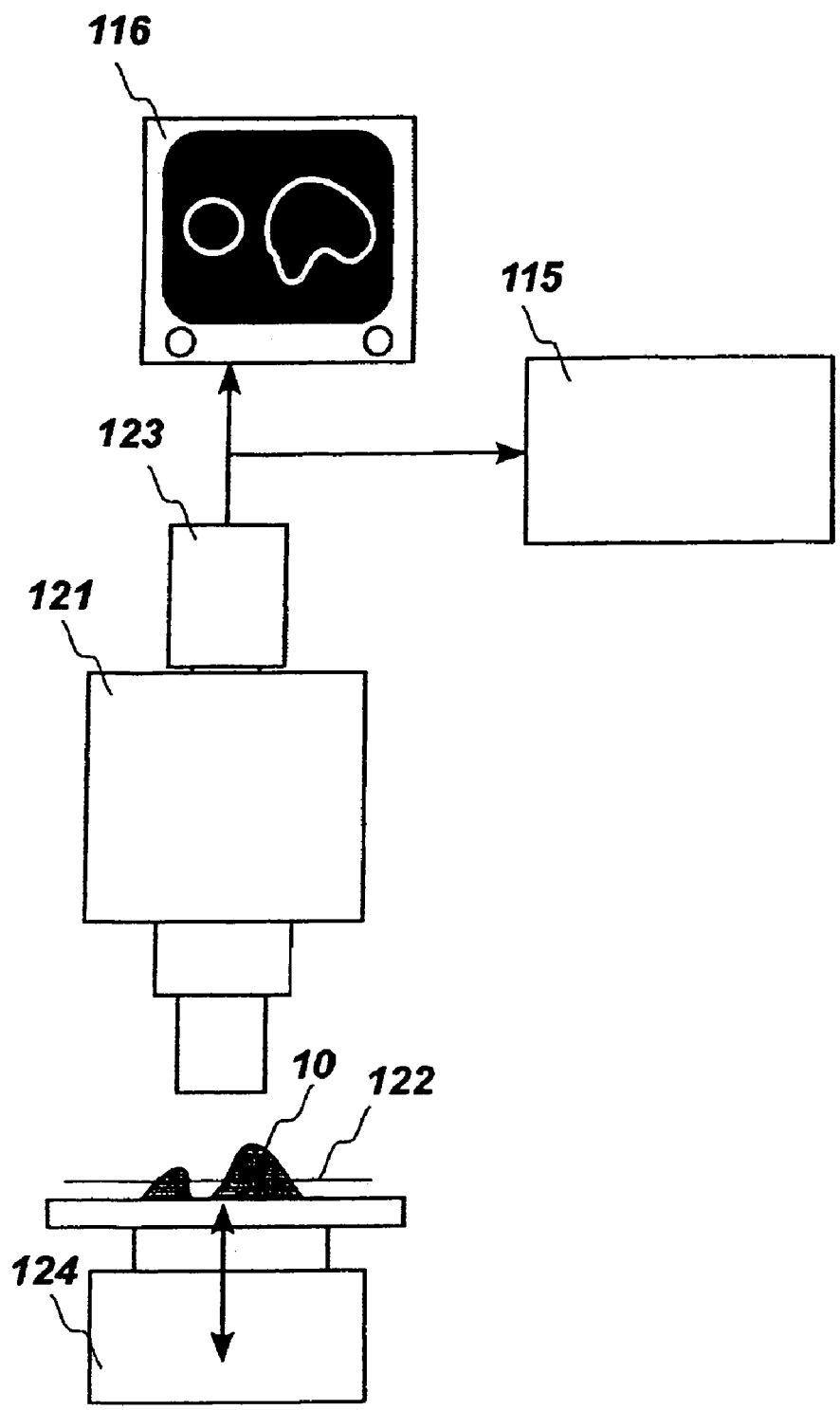
FIG. 12 is a figure for explaining the conventional confocal surface form measurement system.
Figure 13:
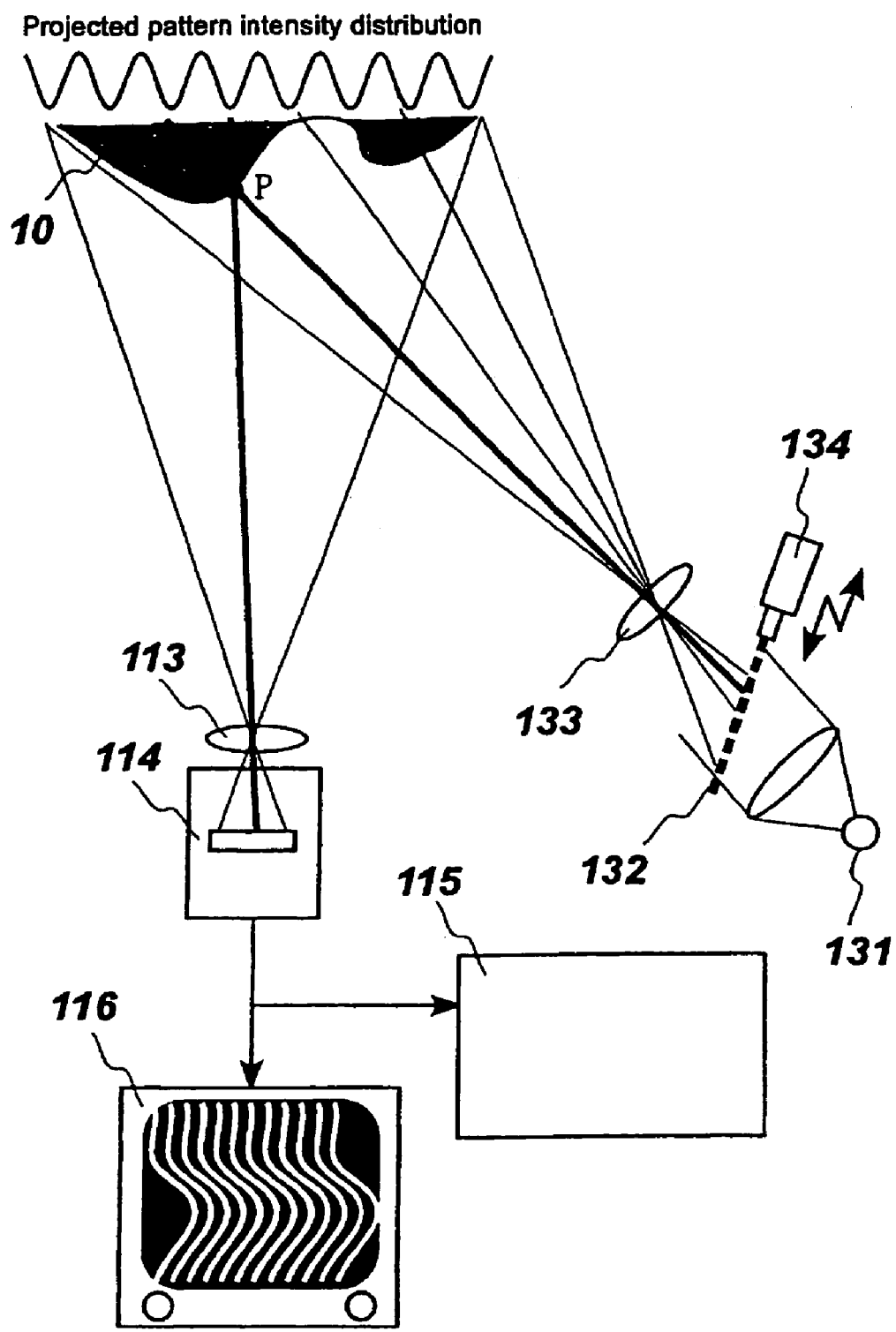
FIG. 13 is a figure for explaining the conventional grating projection phase shift surface form measurement system.
Figure 14:
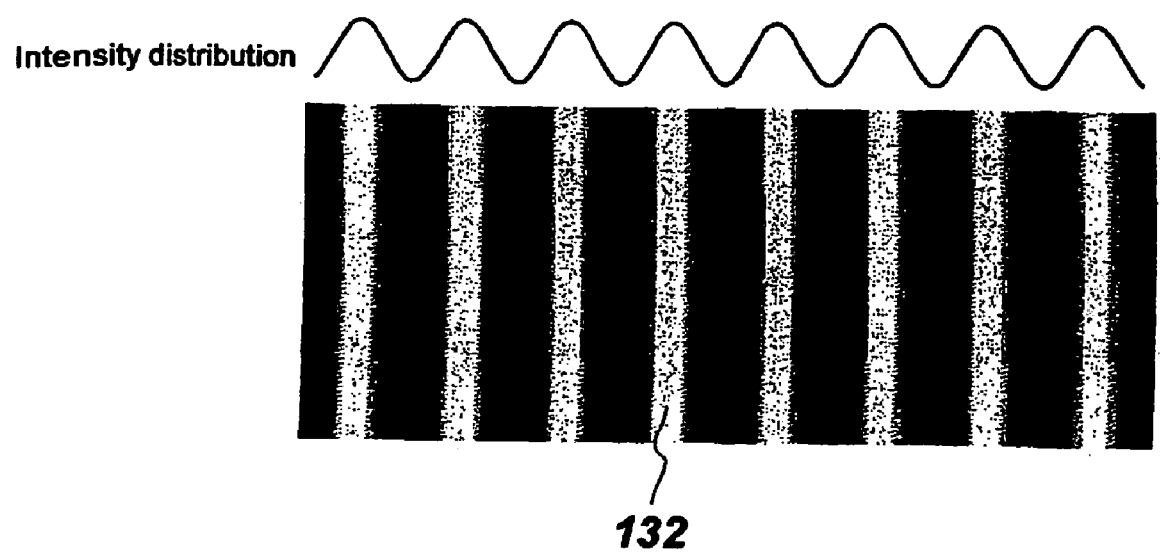
FIG. 14 is a figure for explaining the sinusoidal grating used in the conventional grating projection phase shift surface form measurement system.

Next, an improvement in the speed of the confocal method is explained using FIG. 10. In the conventional device using the confocal method in FIG. 12, the polarization direction detection type two-dimensional light reception timing detection device of the first embodiment is used instead of the usual detector 123. As stated above, the confocal imaging system 121 has the feature where only light from a portion in focus arrives at the charge type imaging devices 7 and 8 as reflective light of an object 10, while hardly any light from a portion out of focus reaches the charge type imaging devices 7 and 8. Therefore, as the object 10 is scanned in the direction of the optical axis with the Z table 124, light reaches the pixel only when the surface of the object 10 passes the conjugate position (the three dimensional imaging position of the pixel in the object side of the objective lens) of each pixel of the charge type imaging devices 7 and 8, and at other timing, light will not reach the pixel. The timing at the light reception will express the position of the Z table 124 at that time, and the position will show the relative position of the surface of an object 10 in the optical axis direction.

Although calculation methods to convert the light reception timing to the surface height of the object 10 differ completely, light hits each pixel of the charge type imaging devices 7 and 8 just once per pulse. Therefore the surface position is derived from the timing, and it is completely the same as that of the example of the light section method mentioned above.

While the shutters of the charge type imaging devices 7 and 8 are released in synchronization with scanning of the Z table 124 over the whole measurement range (from top to bottom in FIG. 10), if the direction of linear polarization incident to the analyzing means is rotated by linear polarization rotation means (for example, the direction of polarization is zero at the top end of the Z table, and π/2 at the bottom, in between, it rotates with a constant angular velocity ω), at each pixel, light enters as a pulse only when the surface of the object 10 passes the conjugate position and when a scan of the Z table 124 is completed and the shutters of the charge type imaging devices 7 and 8 are shut, the intensity ratio which shows the polarization direction at the time of light hitting each pair of pixels of the charge type imaging devices 7 and 8 will be recorded. All that is necessary is to convert back to the surface height of the object 10 on the image analysis device 9.

Also in the confocal method, in order to raise measurement resolution ability, the second embodiment of the polarization direction detection type two-dimensional light reception timing detection device can be introduced. All that is necessary is to rotate the polarizer 2 as many times as possible during one exposure/scan, and derive the position (namely, object surface position) at which light is reflected, as an initial phase from the three images with different phases. However, since the indefiniteness of nπ exists, phase connection processing is needed.

Next, the time of flight method (hereinafter referred to as "TOF method") similarly known as the surface form measurement technique is considered. The TOF method is also realizable by the polarization direction detection type two-dimensional light reception timing detection device. The TOF method is a technique of measuring the relief on the surface of an object by measuring the time interval from light emission until it is reflected by the object and returned. Since this invention is a technique for measuring time, this invention is applicable. That is, pulse-light is irradiated simultaneously at the whole object and returning light is received at the polarization direction detection type two-dimensional light reception timing detection device through an imaging lens. Since the time after the light is emitted and returned differs according to the object surface's relief, the time difference can be measured with the polarization direction detection type two-dimensional light reception timing detection device, and thereby, an object surface form can be determined.

Although examples of the polarization direction detection type two-dimensional light reception timing detection device applied to surface form measurement were shown, the scope of the polarization direction detection type two-dimensional light reception timing detection device is not limited only to these cases. The invention can apply to phenomenon where two-dimensional position is important and at each position, light is radiated or reflected/penetrated only as a pulse. For example, applications to locus measurement of a high-speed moving object, visible light communications, or the like can also be considered.

INDUSTRIAL APPLICABILITY

By this invention, with only one time of imaging (one exposure), one can detect light reception timing for every pixel, and more than several to a few hundred times faster measurement of the surface form measurement is possible than with the conventional methods concerned with the light section method, the grating projection phase shifting method, the confocal method, and the TOF method. Since measurement of moving objects becomes possible, a large effect in extensive fields, such as three dimensional high-speed phenomenon analysis, the three-dimensional vision for a robot or a car, the three dimensional measurement of living bodies of animals and plants, security, and FA is expected.

The invention claimed is:

1. A polarization direction detection type two-dimensional light reception timing detection device, comprising:
   a linear polarization rotation means to linearly polarize incident light and to rotate the polarization direction;
   an analyzing means to divide the incident light which passes through the linear polarization rotation means into at least two different linear polarization components;
   at least two synchronized charge type imaging devices that receive each divided incident light ray, convert the light intensity into an electric signal, and output the electric signal; and
   an image analysis device which analyzes a plurality of image signals output from the charge type imaging devices;
   wherein the light incident on the linear polarization rotation means becomes linearly polarized light having a polarization direction which corresponds to an incident timing, the polarization direction is detected in pixel units by causing the image analysis device to analyze images obtained from the charge type imaging devices, and a light reception timing of the incident light is calculated in pixel units based on the detected polarization direction.

2. The polarization direction detection type two-dimensional light reception timing detection device according to claim 1, comprising a depolarizing means to convert the incident light to light with small intensity variation with respect to polarization directions before the light enters the linear polarization rotation means.

3. A surface form measurement device, comprising:

an imaging lens;

a slit light scanning means to illuminate an object plane of the imaging lens with at least one slit light from an angle different from the optical axis direction of the imaging lens, and to scan the slit light over the object plane; and a polarization direction detection type two-dimensional light reception timing detection device comprising:

a linear polarization rotation means to linearly polarize incident light and to rotate the polarization direction;

an analyzing means to divide the incident light which passes through the linear polarization rotation means into at least two different linear polarization components;

at least two synchronized charge type imaging devices that receive each divided incident light ray, convert the light intensity into an electric signal, and output the electric signal; and an image analysis device which analyzes a plurality of image signals output from the charge type imaging devices;

wherein the light incident on the linear polarization rotation means becomes linearly polarized light having a polarization direction which corresponds to an incident timing, the polarization direction is detected in pixel units by causing the image analysis device to analyze images obtained from the charge type imaging devices, and a light reception timing of the incident light is calculated in pixel units based on the detected polarization direction;

wherein the charge type imaging devices are arranged at an image plane of the imaging lens;

wherein the field of view of the charge type imaging devices is scanned by the slit light scanning means within one exposure time of the charge type imaging devices, and the polarization direction of the incident light to the analyzing means is rotated in synchronization with the scanning of the slit light by the linear polarization rotation means; and wherein a position and an angle of the slit light are determined from light reception timing information in pixel units obtained by the polarization direction detection type two-dimensional light reception timing detection device and then an object surface form is calculated from the position and angle of the slit light.

4. A surface form measurement device, comprising:

a confocal imaging optical system;

a Z-direction scanning means that changes the relative optical pass length between an object and the confocal imaging optical system; and a polarization direction detection type two-dimensional light reception timing detection device comprising:

a linear polarization rotation means to linearly polarize incident light and to rotate the polarization direction;

an analyzing means to divide the incident light which passes through the linear polarization rotation means into at least two different linear polarization components;

at least two synchronized charge type imaging devices that receive each divided incident light ray, convert the light intensity into an electric signal, and output the electric signal; and an image analysis device which analyzes a plurality of image signals output from the charge type imaging devices;

wherein the light incident on the linear polarization rotation means becomes linearly polarized light having a polarization direction which corresponds to an incident timing, the polarization direction is detected in pixel units by causing the image analysis device to analyze images obtained from the charge type imaging devices, and a light reception timing of the incident light is calculated in pixel units based on the detected polarization direction wherein the charge type imaging devices are arranged at an image plane of the confocal imaging optical system;

wherein, within one exposure time of the charge type imaging devices, a measurement range is scanned by the Z-direction scanning means, and the polarization direction of reflective light from the object incident on the analyzing means is rotated by the linear polarization rotation means in synchronization with the scanning over the measurement range; and wherein a position of the Z-direction scanning means is determined from light reception timing information in pixel units obtained by the polarization direction detection type two-dimensional light reception timing detection device to calculate a surface form of an object.

5. A surface form measuring device, comprising:

an imaging lens;

an illuminating means to illuminate an object simultaneously in pulses; and a polarization direction detection type two-dimensional light reception timing detection device comprising:

a linear polarization rotation means to linearly polarize incident light and to rotate the polarization direction;

an analyzing means to divide the incident light which passes through the linear polarization rotation means into at least two different linear polarization components;

at least two synchronized charge type imaging devices that receive each divided incident light ray, convert the light intensity into an electric signal, and output the electric signal; and an image analysis device which analyzes a plurality of image signals output from the charge type imaging devices;

wherein the light incident on the linear polarization rotation means becomes linearly polarized light having a polarization direction which corresponds to an incident timing, the polarization direction is detected in pixel units by causing the image analysis device to analyze images obtained from the charge type imaging devices, and a light reception timing of the incident light is calculated in pixel units based on the detected polarization direction wherein the charge type imaging devices are arranged at an image plane of the imaging lens;

wherein, within one exposure time of the charge type imaging devices, the whole measurement range is illuminated simultaneously at least once by the illuminating means, and the time by which the charge type imaging devices have received the object reflected light is detected; and wherein a surface form of the object is determined by utilizing a phenomenon in which the light reception timing changes according to an object surface's relief.

6. A surface form measurement device, comprising:

an imaging lens;

a slit light scanning means to illuminate an object plane of the imaging lens with at least one slit light from an angle different from the optical axis direction of the imaging lens, and to scan the slit light over the object plane; and a polarization direction detection type two-dimensional light reception timing detection device comprising:

a linear polarization rotation means to linearly polarize incident light and to rotate the polarization direction;

an analyzing means to divide the incident light which passes through the linear polarization rotation means into at least two different linear polarization components;

at least two synchronized charge type imaging devices that receive each divided incident light ray, convert the light intensity into an electric signal, and output the electric signal; and an image analysis device which analyzes a plurality of image signals output from the charge type imaging devices;

wherein the light incident on the linear polarization rotation means becomes linearly polarized light having a polarization direction which corresponds to an incident timing, the polarization direction is detected in pixel units by causing the image analysis device to analyze images obtained from the charge type imaging devices, and a light reception timing of the incident light is calculated in pixel units based on the detected polarization direction;

and depolarizing means to convert the incident light to light with small intensity variation with respect to polarization directions before the light enters the linear polarization rotation means wherein the charge type imaging devices are arranged at an image plane of the imaging lens;

wherein the field of view of the charge type imaging devices is scanned by the slit light scanning means within one exposure time of the charge type imaging devices, and the polarization direction of the incident light to the analyzing means is rotated in synchronization with the scanning of the slit light by the linear polarization rotation means; and wherein a position and an angle of the slit light are determined from light reception timing information in pixel units obtained by the polarization direction detection type two-dimensional light reception timing detection device and then an object surface form is calculated from the position and angle of the slit light.

7. A surface form measurement device, comprising:

a confocal imaging optical system;

a Z-direction scanning means that changes the relative optical pass length between an object and the confocal imaging optical system; and a polarization direction detection type two-dimensional light reception timing detection device comprising:

a linear polarization rotation means to linearly polarize incident light and to rotate the polarization direction;

an analyzing means to divide the incident light which passes through the linear polarization rotation means into at least two different linear polarization components;

at least two synchronized charge type imaging devices that receive each divided incident light ray, convert the light intensity into an electric signal, and output the electric signal; and an image analysis device which analyzes a plurality of image signals output from the charge type imaging devices;

wherein the light incident on the linear polarization rotation means becomes linearly polarized light having a polarization direction which corresponds to an incident timing, the polarization direction is detected in pixel units by causing the image analysis device to analyze images obtained from the charge type imaging devices, and a light reception timing of the incident light is calculated in pixel units based on the detected polarization direction;

and depolarizing means to convert the incident light to light with small intensity variation with respect to polarization directions before the light enters the linear polarization rotation means wherein the charge type imaging devices are arranged at an image plane of the confocal imaging optical system;

wherein, within one exposure time of the charge type imaging devices, a measurement range is scanned by the Z-direction scanning means, and the polarization direction of reflective light from the object incident on the analyzing means is rotated by the linear polarization rotation means in synchronization with the scanning over the measurement range; and wherein a position of the Z-direction scanning means is determined from light reception timing information in pixel units obtained by the polarization direction detection type two-dimensional light reception timing detection device to calculate a surface form of an object.

8. A surface form measuring device, comprising:

an imaging lens;

an illuminating means to illuminate an object simultaneously in pulses; and the polarization direction detection type two-dimensional light reception timing detection device comprising:

a linear polarization rotation means to linearly polarize incident light and to rotate the polarization direction;

an analyzing means to divide the incident light which passes through the linear polarization rotation means into at least two different linear polarization components;

at least two synchronized charge type imaging devices that receive each divided incident light ray, convert the light intensity into an electric signal, and output the electric signal; and an image analysis device which analyzes a plurality of image signals output from the charge type imaging devices;

wherein the light incident on the linear polarization rotation means becomes linearly polarized light having a polarization direction which corresponds to an incident timing, the polarization direction is detected in pixel units by causing the image analysis device to analyze images obtained from the charge type imaging devices, and a light reception timing of the incident light is calculated in pixel units based on the detected polarization direction;

and depolarizing means to convert the incident light to light with small intensity variation with respect to polarization directions before the light enters the linear polarization rotation means wherein the charge type imaging devices are arranged at an image plane of the imaging lens;

wherein, within one exposure time of the charge type imaging devices, the whole measurement range is illuminated simultaneously at least once by the illuminating means, and the time by which the charge type imaging devices have received the object reflected light is detected; and wherein a surface form of the object is determined by utilizing a phenomenon in which the light reception timing changes according to an object surface's relief.

* * * * *